United States Patent [19]

Trembley et al.

[11] Patent Number: 4,546,226

[45] Date of Patent: Oct. 8, 1985

[54] METHOD AND APPARATUS FOR THE CONVEYING AND RADIO FREQUENCY PROCESSING OF DIELECTRIC MATERIALS

[75] Inventors: John F. Trembley, Loudonville, N.Y.; John L. Hull, Huntington Valley, Pa.

[73] Assignee: Entron Technologies, Inc., Franklin, Tenn.

[21] Appl. No.: 372,926

[22] Filed: Apr. 29, 1982

[51] Int. Cl.[4] .............................................. H05B 6/46
[52] U.S. Cl. ............................. 219/10.81; 219/10.41; 219/10.69; 425/145; 425/174.8 E
[58] Field of Search .............. 219/10.41, 10.81, 10.69, 219/10.71, 10.73, 10.77, 10.75; 264/25, 26, 27, 40.7; 425/174, 174.8, 174.8 E, 143, 145

[56] References Cited

U.S. PATENT DOCUMENTS

| | | | |
|---|---|---|---|
| 1,998,332 | 4/1935 | Page | 219/10.41 |
| 2,353,362 | 7/1944 | Rudd | 219/10.81 |
| 2,783,350 | 2/1957 | Pircon | 219/10.69 |
| 4,032,740 | 6/1977 | Mittleman | 219/10.77 |
| 4,041,267 | 8/1977 | Wechsler | 219/10.55 B |
| 4,294,624 | 10/1981 | Veltman | 219/10.55 A |
| 4,311,446 | 1/1982 | Hold et al. | 425/145 X |
| 4,326,255 | 4/1982 | Fujita | 425/145 X |
| 4,338,078 | 6/1982 | Lampkin | 432/209 X |
| 4,392,804 | 7/1983 | Pushee et al. | 425/174.8 E |

Primary Examiner—Roy N. Envall, Jr.
Assistant Examiner—M. M. Lateef
Attorney, Agent, or Firm—Oliver D. Olson

[57] ABSTRACT

Particulate dielectric material is processed by radio frequency (RF) energy while being simultaneously conveyed from an inlet to an outlet, by disposing the transmitting and receiving electrodes of an RF generator diametrically opposite each other on the outside of a conveyor tube containing a screw conveyor, both the tube and screw being made of dielectric material. A fiberoptic probe is located at one end to sense the temperature of the particulate material in the conveyor tube and is connected at the opposite end to an infrared sensor which provides an electric output signal proportional to the sensed temperature. This output signal is coupled to a set point controller which provides an electric output signal representing a small temperature range above and below a selected set point temperature, and the latter output signal is coupled to a duty cycle regulator which operates to regulate the "on" time of the RF generator.

12 Claims, 5 Drawing Figures

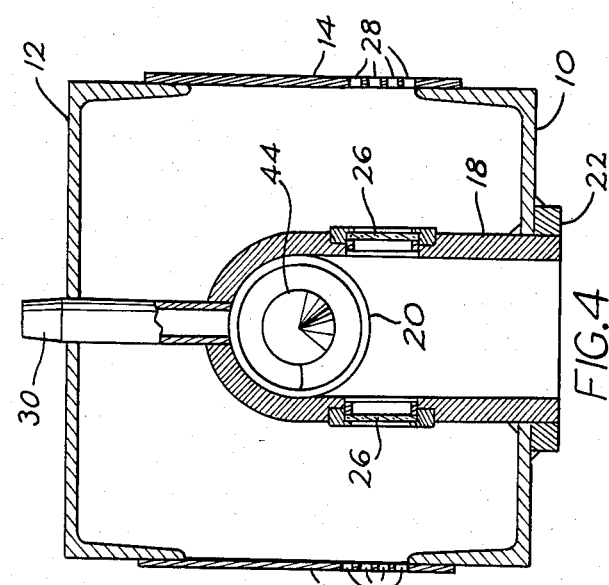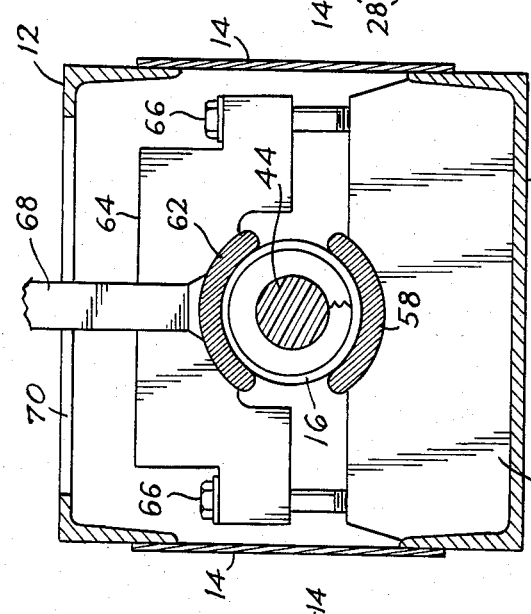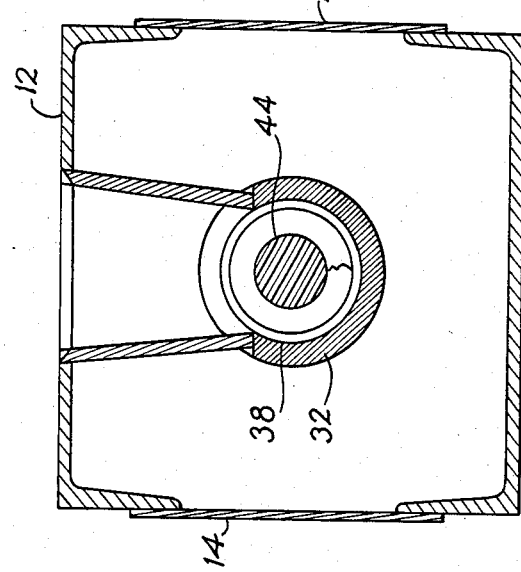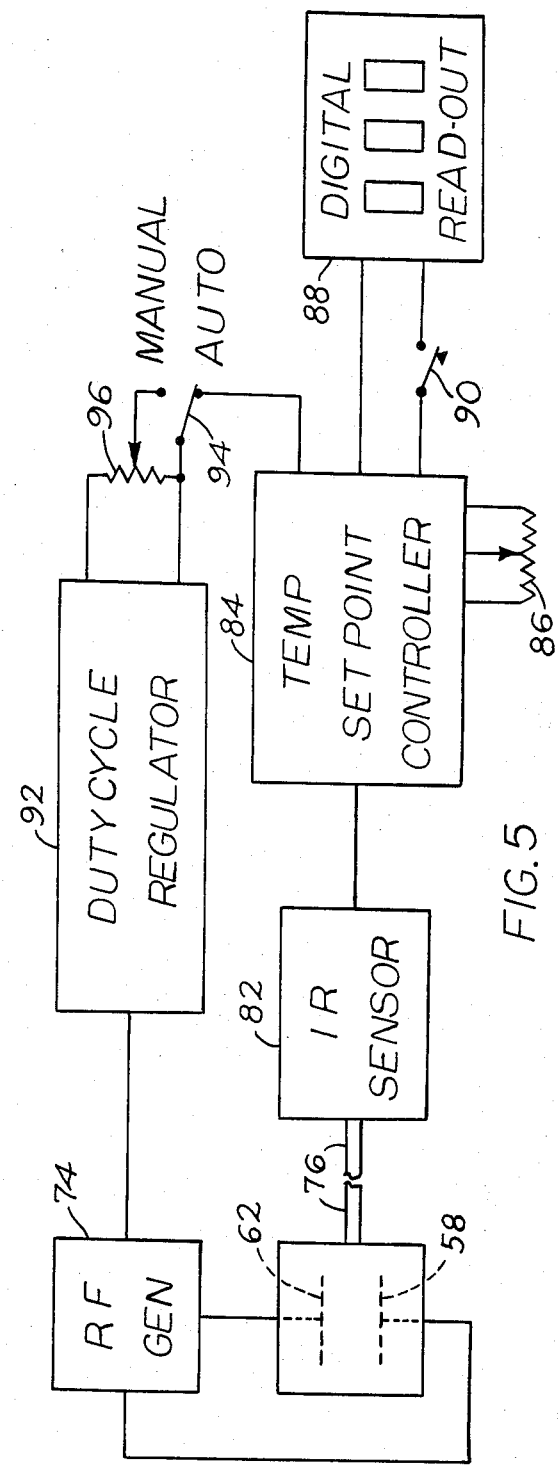

METHOD AND APPARATUS FOR THE CONVEYING AND RADIO FREQUENCY PROCESSING OF DIELECTRIC MATERIALS

BACKGROUND OF THE INVENTION

This invention relates to the radio frequency (RF) processing of particulate dielectric materials, and more particularly to novel method and apparatus for the RF processing of such materials while simultaneously conveying the material between an inlet and an outlet.

The heating or other processing of a wide variety of particulate dielectric materials, such as thermoplastic and thermosetting synthetic resins, rubber and other elastomeric materials, and chemicals and food products, for such purposes as heating, dehydrating, devolutilizing, plasticating, sterilizing and pasteurizing, heretofore has been accomplished by a wide variety of means and methods. For example, heat has been provided by electrical resistance heaters, heat transfer liquids, radiation heating such as infrared, hot air, feed screw friction and other forms of conductive and shear heating. Such forms of heating are only about 20 to 30% efficient, reflecting correspondingly long residence time and thus correspondingly high energy costs. Adequate temperature control is difficult to obtain economically, and results in non-uniform heating of the materials, often causing thermal or oxidation degradation of properties.

The processing of such materials by radio frequency energy has been shown to be faster and less costly than the other heating methods discussed above. However, RF processing of particulate materials while simultaneously moving the materials between an inlet and an outlet, heretofore has been generally limited to the conveyor belt and vibratory type, or plunger type conveying systems, such as equipment for the injection molding of synthetic plastic resins. Typical of this type of equipment are those disclosed in U.S. Pat. Nos. 2,386,966 and 2,443,594.

Further, in all prior forms of RF processing of particulate materials while simultaneously conveying them between an inlet and an outlet, the precision and speed with which the temperature of the materials being processed is controlled, are deficient, resulting in high scrap rates and poor quality.

Most RF equipments of the prior art have incorporated various types of devices to control process temperature, with only minimal success. The reason for these deficiencies is that most devices, such as variable vacuum capacitors, SCR controllers and electromechanical systems are too slow in responding to control signals, resulting in process temperature fluctuations of 10° F. to 20° F. or more.

The most significant process variable which the aforementioned devices cannot efficiently respond to is power line voltage fluctuations, which are common across the country. In many instances line voltage changes by as much as ±25 volts or more, which in turn causes the process temperature to change by as much as ±50° F.

SUMMARY OF THE INVENTION

In its basic concept, this invention provides for the simultaneous conveying and RF processing of particulate dielectric materials by conveying the materials through a passageway made of dielectric material by means of a conveyor screw also made of dielectric material, and controlling the temperature of the particulate material by regulating the duty cycle of an RF generator supplying RF energy to electrodes positioned outside the passageway.

It is by virtue of the foregoing basic concept that the principle objective of this invention is achieved; namely, the provision of method and apparatus of the class described which affords the following advantages over the above discussed prior art:

It provides for processing particulate materials at an operating efficiency of about 60 to 80%, as a measure of electrical energy input versus BTU input to the product.

It eliminates heat lag and thermal delay problems.

It provides precise temperature control, with no temperature gradients.

It provides for extremely short residence time.

It achieves in-line drying of hygroscopic materials.

It affords dissipation and/or evaporation of monomers from polymers and various other materials.

It facilitates removal of residual solvents from polymers and other materials.

It substantially reduces the need for various stabilizers, lubricants and other process aids which are required in conventional processes.

It achieves more uniform heating throughout the material, thereby enabling lower stock termperatures, contributing beneficially to increased production and upgrading the properties of the finished product.

It is adaptable to extrusion, injection and other processes.

It is applicable in research and development programs in processing technology as related to alloying, new polymers, copolymers, homopolymers, cross-linking polymers such as ultra high molecular weight polymers, thermoplastic pultrusion, blow molding and others.

It is also applicable in pharmaceutical and food processing by providing control of product temperature and affording capability for drying and sterilization or pasteurization at low temperatures in the range of 130°–160° F.

Further, it is of significant value in retrofitting and field conversions on many thousands of existing injection molding and extrusion machines in place, to upgrade process efficiency and conserve our vital energy resources.

The foregoing and other obJects and advantages of this invention will appear from the following detailed description, taken in connection with the accompanying drawings of a preferred embodiment.

BRIEF DESCRIPTION OF THE DRAWINGS

FIG. 2 is a transverse section taken on the line 2—2 in FIG. 1.

FIG. 3 is a transverse section taken on the line 3—3 in FIG. 1.

FIG. 4 is a transverse section taken on the line 4—4 in FIG. 1.

FIG. 5 is a schematic block diagram of an electrical control circuit for the RF heating system of the apparatus of FIG. 1.

DESCRIPTION OF THE PREFERRED EMBODIMENT

Figure 1:
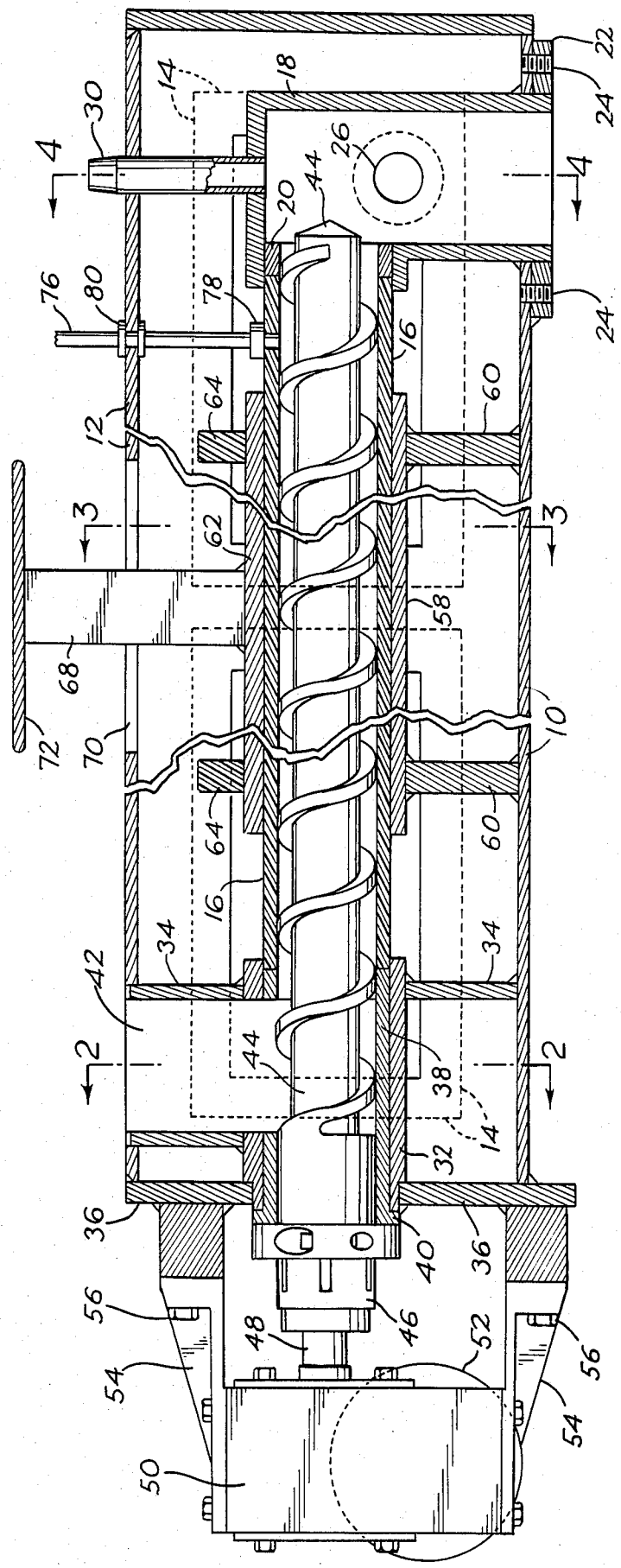
FIG. 1 is a foreshortened, longitudinal vertical section through a screw conveyor and RF heater embodying the features of this invention.

It has been predictably found that when dielectric materials in particulate form having a natural dissipation power factor between 0.001 and 0.030 at 1 MHz are subjected to radio frequency energy, molecular excitation occurs.

When the molecules are exposed in the electrostatic field, they rotate back and forth at the same rate as the operating frequency of the generator. Each molecule, depending on its individual size, shape, mass and electrical structure, responds in varying degrees to the rapidly reversing field by rotating to align with the instantaneous field.

The RF energy absorbed by the molecule is translated into rotational kinetic energy of the entire molecule, resulting in a temperature rise. This action will cause the material being processed to dry, devolatilize, cure, or react by whatever mechanism is inherent to its composition.

Dielectric materials having a dissipation power factor of 0.0001 or less at 1 MHz, can be modified and made responsive to RF energy by the addition of polar additives. Typically, polar materials such as conductive carbon black, pigments, colorahts, flame retardants and fillers, as well as other components, are suitable for this modification. Another polar additive currently available is Frequon, supplied by Phillips Petroleum Company.

In accordance with this invention, by providing a radio frequency generator having a controllable power output, the temperature of the material being processed can be controlled within ±1° F., by incorporating a closed loop automatic temperature controller.

It has also been found that in accordance with this invention the ambient temperature and fluctuations therein are not a concern, and the automatic temperature control system will still control the material temperature within the aforementioned ±1° F. from set point.

It has also been found that in accordance with this invention the normal power line voltage fluctuations therein are not a concern, and the automatic temperature control system will still control the material temperature within the aforementioned ±1° F. from set point.

The radio frequency energy used in this invention may range between 1 and 5000 MHz. The heat generated is proportional to the RF frequency and the RF voltage across the work electrodes. At the higher frequencies, however, especially in the microwave range, there is the possibility of health hazzards to operators and other personnel in the immediate area of the equipment. Accordingly, it has been found that a frequency range between about 13 and about 150 MHz provides for an acceptable energy input to the material being processed, and requires only simple shielding to comply with all industry and government standards and regulations.

Specifically, the 100 MHz frequency range with RF voltages across the work electrodes of between about 15,000 and about 30,000 volts, has been most successful for this process.

In accordance with this invention, various types of dielectric materials have been successfully processed at temperatures ranging from less than 130° F. to over 750° F. Such materials have been dried in normal atmosphere to moisture contents of less than 0.01% by weight. Dielectric materials of different specific heat properties and different dissipation power factors may be processed together.

In the illustrated embodiment, the apparatus includes an elongated housing formed of a bottom channel member 10 oriented with its side walls extending upwardly, a top channel member 12 oriented with its side walls extending downwardly, and side plates 14 secured to the side walls of the bottom and top channel members and supporting the latter in vertically spaced apart relationship.

Extending longitudinally within the hollow housing is an elongated conveyor tube 16. It is made of dielectric material. Although a wide variety of dielectric materials are suitable for the tube, it is preferred to utilize a high temperature synthetic thermoplastic resin, such as Ryton, a polyphenylene sulfide product of Phillips Chemical Co. It is capable of continuous service at temperatures up to about 400° F., is impervious to most chemicals and acids and is readily formable or machinable to tubular and other shapes. When the conveyor tube is to be used at higher temperatures, it is formed from alumina ceramic, $Al_2O_3$, or other suitable material.

The outlet end of the conveyor tube is supported in an annular opening in the side of a vertically elongated discharge pipe 18. An annular ring 20 in the opening forms an abutment for the tube. The outer end of the discharge pile extends through an opening in the bottom wall 10 of the housing adjacent one end of the latter. An external collar 22 is secured to the discharge pipe. The wall and collar are provided with threaded openings 24 for coupling of the outer end of the discharge pipe to ancillary equipment for further processing the particulate material discharged from the pipe.

The side walls of the discharge pipe 18 are fitted with transparent viewing windows 26 aligned with openings 28 in the side wall plates 14 of the housing, for visual inspection of material discharging from the conveyor tube 16. A conduit 30 communicates with the interior of the discharge pipe at the inner end thereof and extends upward through the top channel member 12 of the housing for connection either to a source of vacuum when it is desired to evacuate the discharge passageway and the space between the conveyor tube 16 and screw conveyor 44, or to a source of inert gas when it is desired to provide the discharge passageway and space between the conveyor tube and screw conveyor with an inert atmosphere. Evacuation affords significant improvement in removal of water vapor and other gases, while purging with inert gas facilitates much higher temperature processing and minimizes both thermal and oxidation degradation.

The opposite inlet end of the conveyor tube 16 is supported in the outlet end of a feed pipe 32 supported at said end in an opening in an intermediate wall 34 which traverses the inside of the housing adjacent the end opposite the discharge pipe 18. The opposite end of the feed pipe extends through the end wall 36 of the housing. The end of the conveyor tube in pipe 32 abuts the confronting end of a sleeve 38 which extends through the feed pipe. An annular collar 40 on the outer end of the sleeve abuts the corresponding outer end of the feed pipe.

The upper portions of the feed pipe and sleeve are cut away in the area between the walls 34 and 36, which area forms an inlet passageway 42 for receiving, as from a storage hopper (not shown) particulate material to be processed.

Mounted rotatably within the conveyor tube 16 and the feed pipe extension 32 is an elongated conveyor screw 44. Like the conveyor tube, the conveyor screw is made of dielectric material, such as the Ryton or $Al_2O_3$, previously mentioned, or other suitable material. The outer diameter of the screw flight is substantially equal to the inner diameter of the conveyor tube and feed pipe by which it is supported for rotation.

The end of the elongated conveyor screw opposite the discharge pipe 18 extends through the feed pipe and is typically connected detachably by a coupling 46 to the output drive shaft 48 of a gear reduction unit 50 the input of which is connected to an electric drive motor 52. It will be apparent to those skilled in the art that many other screw drive mechanisms may be employed, as desired. The motor and gear reduction unit is supported as an assembly by means of a pair of brackets 54 projecting from the end wall 36 of the housing and secured thereto by bolts 56.

Means is provided externally of conveyor tube 16 for supplying RF energy for heating particulate dielectric material being conveyed through the space between the flights of conveyor screw 44 and tube 16, from the inlet end to the discharge pipe. In the embodiment illustrated, a grounded, or receiving electrode 58 of an electrically conductive material is supported by a plurality of longitudinally spaced, transverse plates 60 secured to the bottom channel member 10 of the housing. This receiving electrode is arcuate in cross-section, substantially matching the curvature of the conveyor tube, but is less then a semicircle. It extends along the major portion of the length of the tube.

Overlying the conveyor tube 16, diametrically opposite the receiving electrode, is an elongated, electrically conductive transmitting electrode 62. It is substantially the same length as the receiving electrode and is of corresponding arcuate cross section. Like the receiving electrode, the transmitting electrode is less then a semicircle. Accordingly, the electrodes are spaced apart at their edges sufficiently to avoid any tendency for arcing.

The transmitting electrode is held in place by a plurality of electrically non-conductive transverse plates 64 each of which is aligned with one of the underlying support plates 60 for the receiving electrode. Clamp bolts 66 extend through openings in the opposite side portions of the upper plates 64 and are threaded into tapped openings in the associated lower plates 60. It is by this means that the electrodes are clamped removably to the outer surfaces of the conveyor tube 16.

An electrically conductive post 68 is secured at its inner end to the transmitting electrode 62 and projects upwardly through an opening 70 in the top channel member 12 of the housing. At its outer end the post is fitted with a horizontal plate 72 of electrically conductive material which serves as a capacity coupling electrode for the primary transmitting electrode of an RF generator 74 (FIG. 5). In this regard, it will be apparent to those skilled in the art that any conventional form of RF generator may be utilized for this invention, and it may be connected to the electrodes 58 and 62 in any of various conventional ways.

Precise control of temperature of the material being processed is provided by the electronic closed loop automatic control circuitry illustrated in FIG. 5. Thus, a fiberoptic probe 76 is mounted at one end in an opening in the dielectric conveyor tube 16 (FIG. 1) adjacent the outfeed end thereof, as by means of a mounting collar 78. It extends outwardly through an opening in the top wall 12 of the housing, being protected there by a sealing grommet 80. The opposite end of the fiberoptic probe is connected to an infrared sensor 82 of the type that provides an output electric signal the magnitude of which is proportional to the temperature of the material being conveyed through the space between the conveyor tube 16 and the flights of the screw conveyor 44. Various types of such infrared sensors are available commercially, and these are exemplified by the FIBER VIEW 6200 of Williamson Corporation.

The electric output signal from the infrared sensor unit is connected to the input of a temperature set point controller 84. Typical of this type of controller is AP 2167 of Action Instruments Co., Inc. The electrical signal from the infrared sensor unit is supplied to the input of this controller and is compared with an electrical signal representing the temperature set point for the material being processed. This set point is adjustable over a range by means of a set point control potentiometer 86. This set point temperature is visually displayed on the digital read-out indicator 88 by closing the set point read-out switch 90. When this switch is open, the digital read-out indicator continuously registers the process temperature, i.e. the temperature of the material as it passes the end of the fiberoptic probe adjacent the discharge end of the screw conveyor.

The digital readout indicator is a conventional analog-to-digital converter with visual display. Among the many suitable units commercially available is model AN 2570 of Analogic Corporation.

The controller 84 illustrated provides an electric output signal which varies between 0 and 1 volt, proportional to a temperature range extending to predetermined limits above and below a selected set point temperature.

The output of the temperature set point controller 84 is connected to the input of a duty cycle regulator 92, such as the model EN 259 by Ultramic Industries, Inc. The electric output signal from the regulator is typically connected to the control grid of the oscillator tube of the RF generator 74 to effect turning the oscillator on and off. In the illustrated embodiment, a 0 volt output signal from the controller to the regulator results in the RF generator being turned on about 5% or less of the time, thereby providing about 5% or less of full power output from the generator. A 1 volt signal from the controller to the regulator causes the RF generator to be fully on at all times, thereby providing 100% full power output from the generator. The "on" time, or duty cycle of the RF generator, is varied smoothly between 5% or less and 100% as the signal from the controller to the regulator varies between 0 and 1 volt.

The range of temperature over which the RF power is smoothly controlled preferably is set at about ±1° F., centered around the set point temperature. Thus, when the process temperature is above this range the RF power to the process is limited to about 5% or less of full power. Similarly, when the process temperature is below this range, maximum RF power is applied to the process.

It is to be noted in FIG. 5 that the electric output signal from the controller 84 to the regulator 92 is through a selector switch 94 adjusted to the "automatic" position.

When this switch is in the "manual" position, RF power applied to the process may be adjusted smoothly between the 5% or less and the 100% range by varying the potentiometer 96. Process temperature is still displayed by the digital read-out indicator 88.

The temperature control circuitry described herein has been found to be capable of maintaining a set point temperature of dielectric material being processed through the space between the dielectric conveyor tube 16 and screw 44 within ±1° F. When incorporated as a first stage of a conventional extrusion or injection machine, it was found that the length to diameter ratio of the conventional machine could be reduced considerably while substantially increasing the rate of throughput. Further, processing temperatures could be lowered by from 10° F. to more than 50° F., resulting in shorter cool-down cycles and therefore production of product with improved properties.

When incorporated as a first stage of a conventional extrusion or injection machine, it was found the throughput capacity of the machine could be increased from at least 30% to more than 100%. Further, total energy demand to drive the screw motor was reduced between 30 and 75% of normal operating conditions. Also, material process temperatures could be lowered by at least 10° F. to more than 50° F., because of no temperature gradients in the material.

It will be apparent to those skilled in the art that various changes may be made in the process and apparatus details described hereinbefore. For example, the discharge pipe 18 may be replaced by a plunger-cylinder assembly forming the second stage of an injection molding machine, or a screw conveyor-cylinder assembly forming the second stage of an extrusion machine, or reciprocating screw injection molding machine, as previously suggested herein. Indeed, the conveyor tube 16 and screw conveyor 44 may communicate directly with an extrusion die. These and other changes may be made, as desired, without departing from the spirit of this invention and the scope of appended the claims.

Having now described my invention and the manner in which it may be used, I claim:

1. The method of processing particulate dielectric material while conveying it from an inlet to an outlet, comprising:
   (a) interposing between said inlet and outlet an elongated conveyor tube containing an elongated rotary screw conveyor,
   (b) transmitting RF energy diametrically through the tube and hence the space between the tube and screw conveyor flights, and
   (c) introducing particulate dielectric material into the tube at said inlet for movement by the rotary screw conveyor to said outlet, whereby the particulate material is exposed to the RF energy in said space.

2. The method of claim 1 including applying a vacuum in the space between the tube and screw conveyor.

3. The method of claim 1 including applying an inert gas in the space between the tube and screw conveyor.

4. The method of claim 1 including the step of controlling the temperature to which the particulate material is heated by regulating the duty cycle of the RF generator.

5. The method of claim 1 wherein the conveyor tube and screw conveyor are made of dielectric material and the RF energy is transmitted diametrically through the tube and screw conveyor between transmitting and receiving electrodes positioned on the outside of the tube.

6. Apparatus for processing particulate dielectric material while conveying it from an inlet to an outlet, the apparatus comprising:
   (a) an elongated conveyor tube having inlet and outlet ends,
   (b) an elongated screw conveyor rotatable within the conveyor tube for conveying particulate material from said inlet end to said outlet end, and
   (c) an RF generator including transmitting and receiving electrodes positioned diametrically opposite each other on the outside of the conveyor tube and arranged to transmit RF energy diametrically through the conveyor tube and hence the space between the conveyor tube and screw conveyor flights.

7. The apparatus of claim 6 wherein the conveyor tube and screw conveyor are of dielectric material.

8. The apparatus of claim 6 including conduit means communicating with the space between the conveyor tube and screw conveyor for applying a vacuum thereto.

9. The apparatus of claim 6 including conduit means communicating with the space between the conveyor tube and screw conveyor for applying an inert gas thereto.

10. The apparatus of claim 6 including means associated with the RF generator for regulating the duty cycle thereof, whereby correspondingly to control the temperature of the particulate material being processed.

11. The apparatus of claim 6 including:
    (a) temperature sensing means operable to produce an electric output signal proportional to the temperature of the dielectric material being conveyed through the conveyor tube,
    (b) temperature set point control means having an input connected to the output of the temperature sensing means and operable to provide an electric output signal the minimum magnitude of which represents a predetermined temperature below a selected set point temperature and the maximum magnitude of which represents a predetermined temperature above the selected set point temperature, and
    (c) duty cycle regulator means having an input connected to the output of the temperature set point control means and an output connected to the RF generator, and operable automatically to regulate the duty cycle of the RF generator in proportion to the magnitude of the output of electric signal from the temperature set point control means.

12. Apparatus for processing particulate dielectric material while conveying it from an inlet to an outlet, the apparatus comprising:
    (a) an elongated dielectric conveyor tube having inlet and outlet ends,
    (b) an elongated dielectric screw conveyor rotatable within the conveyor tube for conveying particulate material from said inlet end to said outlet end,
    (c) an RF generator arranged to transmit RF energy diametrically through the tube and hence the space between the conveyor tube and screw conveyor flight, the RF generator including transmitting and receiving electrodes positioned diametrically opposite each other on the outside of the conveyor tube, (d) temperature sensing means operable to produce a electric output signal proportional to the temperature of dielectric material being conveyed through the conveyor tube, the temperature sensing means including a fiberoptic probe positioned at one end adjacent the space between the conveyor tube and screw conveyor and connected at the opposite end to an infrared sensor operable to produce an electric signal proportional to the temperature of dielectric material being conveyed past the probe end in the conveyor tube, (e) temperature set point control means having an input connected to the output of the temperature sensing means and operable to provide an electric output signal the minimum magnitude of which represents a predetermined temperature below a selected set point temperature and the maximum magnitude of which represents a predetermined temperature above the selected set point temperature, and (f) duty cycle regulator means having an input connected to the output of the temperature set point control means and an output connected to the RF generator, and operable automatically to regulate the duty cycle of the RF generator in proportion to the magnitude of the output electric signal from the temperature set point means, the duty cycle regulator means including manually adjustable means for providing an input electric signal in place of the electric output signal from the temperature set point control means.

* * * * *

UNITED STATES PATENT AND TRADEMARK OFFICE
CERTIFICATE OF CORRECTION

PATENT NO. : 4,546,226
DATED : 8 October 1985
INVENTOR(S) : John F. Trembley

It is certified that error appears in the above-identified patent and that said Letters Patent are hereby corrected as shown below:

Code [75] Inventors : "John L. Hull, Huntington Valley, Pa." should be omitted.

Col. 7, line 40, "appended the" should read -- the appended --.

Signed and Sealed this

Twenty-fourth Day of December 1985

[SEAL]

Attest:

DONALD J. QUIGG

Attesting Officer

Commissioner of Patents and Trademarks